(12) United States Patent
Kissel

(10) Patent No.: US 9,587,142 B2
(45) Date of Patent: Mar. 7, 2017

(54) PROCESS FOR PREPARING AN OPTICALLY CLEAR SUPERHYDROPHOBIC COATING SOLUTION

(71) Applicant: Lotus Leaf Coatings, Inc., Albuquerque, NM (US)

(72) Inventor: David J. Kissel, Andover, MN (US)

(73) Assignee: Lotus Leaf Coatings, Inc., Albuquerque, NM (US)

( * ) Notice: Subject to any disclaimer, the term of this patent is extended or adjusted under 35 U.S.C. 154(b) by 0 days.

(21) Appl. No.: 14/339,396

(22) Filed: Jul. 23, 2014

(65) Prior Publication Data

US 2015/0030833 A1     Jan. 29, 2015

Related U.S. Application Data

(60) Provisional application No. 61/857,533, filed on Jul. 23, 2013.

(51) Int. Cl.
| | | |
|---|---|---|
| C08G 77/02 | (2006.01) | |
| C09D 183/02 | (2006.01) | |
| C04B 35/632 | (2006.01) | |
| C08K 9/04 | (2006.01) | |

(52) U.S. Cl.
CPC ........... *C09D 183/02* (2013.01); *C08G 77/02* (2013.01); *C08K 9/04* (2013.01)

(58) Field of Classification Search
CPC ........... C04B 41/4582; C08L 2205/026; C08L 2383/02
USPC ........................................ 523/218; 428/307.3
See application file for complete search history.

(56) References Cited

U.S. PATENT DOCUMENTS

| | | | |
|---|---|---|---|
| 3,637,416 A | 1/1972 | Misch et al. | |
| 3,953,115 A | 4/1976 | French et al. | |
| 4,162,350 A | 7/1979 | Yanagisawa et al. | |
| 4,217,038 A | 8/1980 | Letter et al. | |
| 4,808,483 A | 2/1989 | Nakasuji et al. | |
| 5,679,328 A | 10/1997 | Dupuis | |
| 5,869,069 A | 2/1999 | Perrier et al. | |
| 5,948,482 A | 9/1999 | Brinker et al. | |
| 5,989,295 A | 11/1999 | De La Mettrie et al. | |
| 6,039,961 A | 3/2000 | Perrier et al. | |
| 6,126,733 A | 10/2000 | Wallace et al. | |
| 6,258,305 B1 | 7/2001 | Brinker et al. | |
| 6,291,022 B1 | 9/2001 | Hong et al. | |
| 6,375,936 B1 | 4/2002 | Allard et al. | |
| 6,387,855 B1 | 5/2002 | De La Mettrie | |
| 6,565,863 B1 | 5/2003 | Guillou et al. | |
| 6,569,409 B1 | 5/2003 | Hansenne et al. | |
| 6,743,467 B1 | 6/2004 | Jones et al. | |
| 6,756,217 B1 | 6/2004 | Dave et al. | |
| 6,780,828 B2 | 8/2004 | Nagy et al. | |
| 6,793,821 B2 | 9/2004 | Lee et al. | |
| 6,818,206 B2 | 11/2004 | Candau et al. | |
| 6,846,479 B2 | 1/2005 | Lorant et al. | |
| 6,955,803 B2 | 10/2005 | Boutelet et al. | |
| 7,022,144 B2 | 4/2006 | Legrand et al. | |
| 7,025,950 B2 | 4/2006 | Majeti et al. | |
| 7,045,120 B2 | 5/2006 | Boutelet et al. | |
| 7,153,494 B2 | 12/2006 | Chodorowski-Kimmes et al. | |
| 7,166,235 B2 | 1/2007 | Majeti et al. | |
| 7,176,170 B2 | 2/2007 | Dubief et al. | |
| 7,217,298 B2 | 5/2007 | Legrand et al. | |
| 7,217,440 B2 | 5/2007 | Jallouli | |
| 7,232,561 B2 | 6/2007 | Dubief et al. | |
| 7,309,528 B2 | 12/2007 | Clerici et al. | |
| 7,316,809 B2 | 1/2008 | L'Alloret | |
| 7,338,534 B2 | 3/2008 | Kravtchenko et al. | |
| 7,364,596 B2 | 4/2008 | De Boni et al. | |
| 7,399,479 B2 | 7/2008 | Maillefer | |
| 7,470,657 B2 | 12/2008 | Guillou et al. | |
| 7,485,343 B1 | 2/2009 | Branson et al. | |
| 7,618,617 B2 | 11/2009 | Dubief et al. | |
| 7,732,496 B1 | 6/2010 | Leventis et al. | |
| 7,780,742 B2 | 8/2010 | Brun et al. | |
| 7,781,064 B2 | 8/2010 | Huang et al. | |
| 7,806,941 B2 | 10/2010 | Brun et al. | |

(Continued)

FOREIGN PATENT DOCUMENTS

| | | |
|---|---|---|
| CN | 1724353 | 1/2006 |
| CN | 1865136 | 11/2006 |
| EP | 0068671 A2 | 1/1983 |
| EP | 0122483 | 10/1984 |
| EP | 0185526 A3 | 6/1986 |
| EP | 1186641 A2 | 3/2002 |
| EP | 1874875 B1 | 8/2008 |
| EP | 1412415 B1 | 11/2008 |
| JP | 2005162795 | 6/2005 |
| KR | 233768 | 12/1999 |
| WO | 2006114420 A1 | 11/2006 |
| WO | 2007011988 A2 | 1/2007 |
| WO | 2008115812 A2 | 9/2008 |

OTHER PUBLICATIONS

"Silicon Dioxide, Amorphous", http://www.fao.org/ag/agn/jecfa-additives/specs/Monograph1/Additive-385.pdf, 1973.

Li, "Studies on the Silica Aerogel Nanomaterial Prepared by Sol-gel Method", Chinese Doctoral Dissertation & Master's Theses Full-Text Database (Master) Engineering Science and Technology, Jun. 15, 2003.

(Continued)

*Primary Examiner* — Tae H Yoon

(74) *Attorney, Agent, or Firm* — Philip D. Askenazy; Peacock Myers, P.C.

(57) ABSTRACT

Optically clear hydrophobic and superhydrophobic coatings and solutions and methods for preparing them. Branched polysilicate structures having surface hydroxyl groups are formed by at least partially hydrolyzing an alkoxy silane precursor via water and an acid catalyst in a solvent, and catalyzing the hydrolysis product with a base to form a gel. The structures are dispersed to form a colloidal suspension, and then hydrophilic hydroxyl groups on the structures are reacted with a silylating agent and replaced with hydrophobic and/or oleophobic ligands. Additional solvent may be added to form a coating which is optically clear.

12 Claims, 2 Drawing Sheets

(56) References Cited

U.S. PATENT DOCUMENTS

| | | | |
|---|---|---|---|
| 7,850,950 B2 | 12/2010 | Giroud et al. | |
| 7,862,803 B2 | 1/2011 | Kravtchenko et al. | |
| 7,871,445 B2 | 1/2011 | Audousset | |
| 7,875,084 B2 | 1/2011 | Audousset | |
| 7,914,897 B2 | 3/2011 | Zimmermann et al. | |
| 7,942,937 B2 | 5/2011 | Brun | |
| 7,943,234 B2 | 5/2011 | Lawin et al. | |
| 8,029,871 B2 * | 10/2011 | Nakayama | B05D 5/08 427/515 |
| 8,221,870 B2 | 7/2012 | Brown | |
| 8,258,206 B2 | 9/2012 | Kanagasabapathy et al. | |
| 8,586,693 B2 | 11/2013 | Zimmermann et al. | |
| 8,663,742 B2 | 3/2014 | Kissel et al. | |
| 9,040,435 B2 * | 5/2015 | Kissel | C08K 9/06 427/387 |
| 2002/0032272 A1 | 3/2002 | Sievers et al. | |
| 2002/0086039 A1 | 7/2002 | Lee et al. | |
| 2003/0008790 A1 | 1/2003 | Carew et al. | |
| 2004/0120919 A1 | 6/2004 | Nguyen et al. | |
| 2004/0224862 A1 | 11/2004 | Drovetskaya et al. | |
| 2005/0064209 A1 | 3/2005 | Haines et al. | |
| 2006/0263516 A1 | 11/2006 | Jones et al. | |
| 2006/0280710 A1 | 12/2006 | Wong et al. | |
| 2006/0281828 A1 | 12/2006 | Nakayama et al. | |
| 2006/0292345 A1 | 12/2006 | Dave et al. | |
| 2007/0099009 A1 | 5/2007 | Shimizu et al. | |
| 2007/0110690 A1 | 5/2007 | Nguyen et al. | |
| 2007/0134190 A1 | 6/2007 | Cannell et al. | |
| 2007/0275021 A1 | 11/2007 | Lee et al. | |
| 2008/0085253 A1 | 4/2008 | Nguyen et al. | |
| 2008/0085254 A1 | 4/2008 | Nguyen et al. | |
| 2008/0085255 A1 | 4/2008 | Nguyen et al. | |
| 2008/0085258 A1 | 4/2008 | Nguyen et al. | |
| 2008/0107864 A1 | 5/2008 | Zhang et al. | |
| 2008/0131391 A1 | 6/2008 | Ellington et al. | |
| 2008/0311398 A1 | 12/2008 | Bauer et al. | |
| 2009/0011222 A1 | 1/2009 | Xiu et al. | |
| 2009/0053161 A1 | 2/2009 | Nguyen et al. | |
| 2009/0064894 A1 | 3/2009 | Baumgart et al. | |
| 2009/0071493 A1 | 3/2009 | Nguyen et al. | |
| 2009/0169502 A1 | 7/2009 | Quadir | |
| 2010/0314575 A1 | 12/2010 | Gao et al. | |
| 2011/0189116 A1 | 8/2011 | Gauche et al. | |
| 2011/0206925 A1 | 8/2011 | Kissel et al. | |
| 2011/0240907 A1 | 10/2011 | Sharma et al. | |
| 2011/0257281 A1 | 10/2011 | Thomas et al. | |
| 2012/0019767 A1 | 1/2012 | Cadet et al. | |
| 2012/0019915 A1 | 1/2012 | Yan et al. | |
| 2012/0040577 A1 | 2/2012 | Kissel et al. | |
| 2013/0081555 A1 | 4/2013 | Li | |
| 2013/0095276 A1 | 4/2013 | Dave et al. | |
| 2013/0095290 A1 | 4/2013 | Muisener et al. | |
| 2013/0123389 A1 | 5/2013 | Zhu et al. | |
| 2013/0216807 A1 | 8/2013 | Wakefield et al. | |
| 2014/0134907 A1 | 5/2014 | Kissell et al. | |

OTHER PUBLICATIONS

Mulik, et al., "Cross-Linking 3D Assembles of Nanoparticles into Mechanically Strong Aerogels by Surface-Initiated Free-Radical Polymerization", Chemistry of Materials, Jul. 17, 2008, 5035-5046.

Pale-Grosdemange, et al., "Formation of Self-Assembled Monolayers of Chemisorption of Derivatives of Oligo (ehtylene glycol) of Structure HS(CH2)11(OCHG2CH2)mOH on Gold", Journal of the American Chemical Society, 1991, 12-20.

Wang, et al., "Sol-Gel Synthesis and Hydrothermal Processing of Anatase and Rutile Titania Nanocrystals", Chem. Mater., 1999, 3113-3120.

* cited by examiner

PROCESS FOR PREPARING AN OPTICALLY CLEAR SUPERHYDROPHOBIC COATING SOLUTION

CROSS-REFERENCE TO RELATED APPLICATIONS

This application claims priority to and the benefit of filing of U.S. Provisional Patent Application Ser. No. 61/857,533, entitled "An Improved Process for Preparing an Optically Clear Superhydrophobic Coating Solution", filed on Jul. 23, 2013, the specification of which incorporated herein by reference.

BACKGROUND OF THE INVENTION

Field of the Invention (Technical Field)

Embodiments of the present invention relate to the manufacturing and processing of a superhydrophobic coating solution that is optically clear, easy to manufacture, and easy to apply using a variety of coating deposition methods.

Background

Note that the following discussion may refer to a number of publications and references. Discussion of such publications herein is given for more complete background of the scientific principles and is not to be construed as an admission that such publications are prior art for patentability determination purposes.

It is desirable to be able to modify surfaces in order to impart functional properties that include ease of cleaning, dust repellency, extreme levels of water repellency, self-cleaning, corrosion resistance, and the resistance to steam, staining and the adherence of bacteria and other unwanted deposits, while maintaining their cosmetic properties and general appearance by way of an optically clear surface layer or modification. Additionally, methods of manufacturing surface modifying coatings are desired to be low in cost, easily scalable, and not to involve a large number of complicated steps. While the art is replete with coatings having one or only a few of these benefits, there continues to be a demand and search for a system that has several or all of these desired features.

In particular, rendering a surface hydrophobic is advantageous in providing the aforementioned benefits; however imparting extreme hydrophobicity, or superhydrophobicity, to surfaces helps to ensure that the aforementioned functional properties are present. For example, material surfaces such as fabrics, metals, porcelain, glass, and hair can be hydrophobically modified for ease of cleaning and anti-staining benefits. When these surfaces are made superhydrophobic, not only are the aforementioned benefits imparted, but also the observed level of performance is greatly increased. If an optically clear superhydrophobic coating were applied to these materials, then their cosmetic appearances could be preserved along with providing the maximized level of benefits aforementioned.

Even with the extensive body of work in the area of producing superhydrophobic surfaces, there continues to be a search for a coating system that is superhydrophobic, easy to apply to a variety of surfaces, low in cost and process complexity, and optically clear so that the modified material surfaces maintain their visual cosmetic properties. The present invention are improved compositions and methods of manufacture for superhydrophobic coating solutions that are easy to apply to a variety of surfaces and are optically clear when applied to a wide range of materials.

SUMMARY OF THE INVENTION (DISCLOSURE OF THE INVENTION)

The present invention is a method of producing a hydrophobic or superhydrophobic solution, the method comprising forming branched polysilicate structures, the polysilicate structures comprising surface hydroxyl groups; dispersing the branched polysilicate structures, thereby forming a colloidal suspension; and reacting a silylating agent with the hydroxyl groups. Prior to the dispersing step the branched polysilicate structures are preferably suspended in solution, forming a gel. The dispersing step is preferably performed using sonication. The colloidal suspension is preferably metastable. The dispersed polysilicate structures are preferably hydrophilic and the suspension preferably comprises a solvent. The reacting step preferably comprises replacing the hydroxyl groups with hydrophobic ligands. The solution is preferably optically clear after the reacting step. The number of surface hydroxyl groups is preferably sufficient to provide the branched polysilicate structures with high hydroxyl functionality. The branched polysilicate structures preferably have fractal dimensionality. The forming step preferably comprises at least partially hydrolyzing at least one alkoxy silane precursor via water and an acid catalyst in a solvent to form a hydrolysis product; and catalyzing the hydrolysis product with a base to form a gel. The hydrolyzing step is preferably performed with a water to silicon ration of less than 4. The catalyzing step and/or the reacting step are preferably performed between 40° C. to 65° C. The silylating agent is preferably oleophobic. The method preferably further comprises adding a solvent to the solution after the reacting step to form a coating.

The present invention is also a superhydrophobic solution comprising branched polysilicate structures comprising hydrophobic ligands and optional oleophobic ligands. The solution preferably comprises sufficient solvent to enable the solution to be used as a coating to coat a desired substrate using a desired coating method. The coating preferably has a thickness between 0.09 μm and 3 μm. The coating preferably comprises a nanoporous metal oxide imparted with hydrophobic ligands or oleophobic ligands. The coating is preferably optically clear and preferably comprises a pore size of between 5 nm to 1 micron.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

As used herein, the terms "hydrophobic" and "hydrophobicity" describe the wettability of a surface (e.g., a coating surface) that has a water contact angle of approximately 85° or more. The terms "superhydrophobic" and "superhydrophobicity" describe the wettability of a surface (e.g., a coating surface) that has a water contact angle of approximately 150° or more and very low contact angle hysteresis ($\Delta\theta=\theta_{ADV}-\theta_{REC}<5°$). Typically, on a hydrophobic surface, for example, a 2-mm-diameter water drop beads up but does not run off the surface when the surface is tilted moderately.

As the surface is tilted, the wetting angle at the downhill side of the droplet increases, while the wetting angle at the uphill side of the droplet decreases. Since it is difficult for the advancing (downhill) interface to push forward onto the next increment of solid surface and it is difficult for the receding (uphill) interface to let go of its portion of solid surface, the droplet tends to remain stationary or pinned in place. A hydrophobic surface is described as having a low contact angle hysteresis if the difference between advancing and receding contact angles is less than 5°. The ability for water droplets to slide or roll on a superhydrophobic surface leads to a self-cleaning mechanism where deposits or surface contaminants are removed by the water droplets as they slide or roll over the surface.

In accordance with various embodiments of the present invention, an improved method for preparing a superhydrophobic coating solution comprises providing a dispersed hydrophilic polysilicate gel, which is preferably prepared using at least one alkoxy silane precursor that has been either fully or partially hydrolyzed via water and an acid catalyst in an alcohol, diluted in additional alcohol after the hydrolysis step, and catalyzed with a base to form a gel; reacting the dispersed hydrophilic gel with a silylating agent to impart hydrophobic ligands; and finally adding additional solvents to allow ease of coating for a variety of substrates. The hydrophilic gel preferably comprises a three-dimensional network of branched polysilicates, the specific structure of which is tailored by the process conditions such as catalyst, choice of alcohol, and reaction temperature. The branched polysilicates preferably form a loosely connected network and have a high degree of hydroxyl functionality. The network may comprise a plurality of pores in which a fluid is present. Exemplary fluids include the alcohols present during the hydrolysis step, the diluent alcohol, alcohols generated from the hydrolysis reaction, reaction products of the base-catalyzed gelation reaction, and un-reacted materials such as, for example, alkoxy silane precursors.

Figure 1:
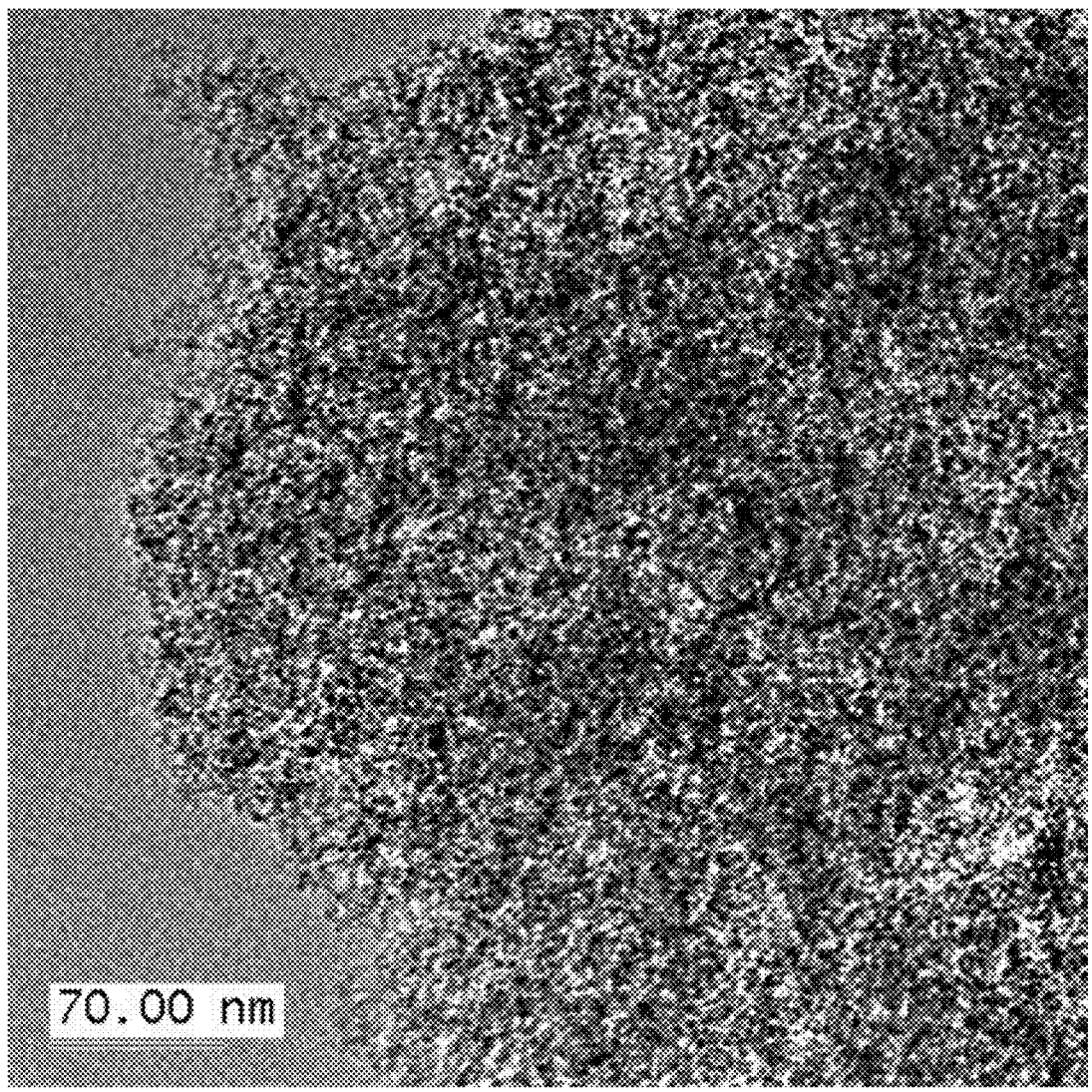
FIG. 1 is a transmission electron micrograph of a coating material of the present invention showing the fractal nature of the branched polysilicate structures.
Figure 2:
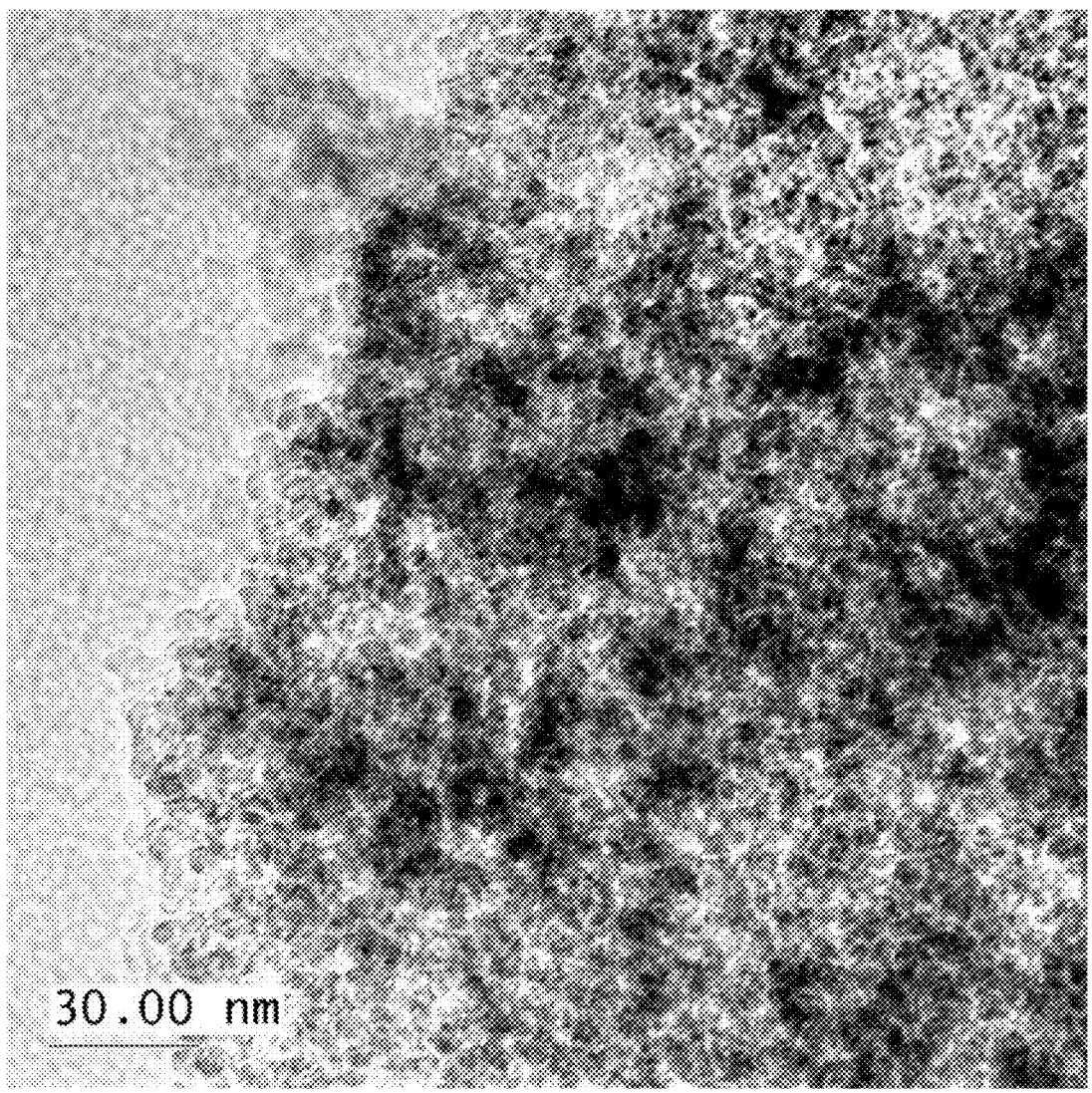
FIG. 2 is a transmission electron micrograph showing the fine scale features of the branched polysilicate structures shown in FIG. 1.

FIG. 1 is a transmission electron micrograph of a coating material of the present invention showing the fractal nature of the branched polysilicate structures. FIG. 2 is a transmission electron micrograph showing the fine scale features of the branched polysilicate structures shown in FIG. 1. The polysilicate structures are preferably branched as shown, and do not substantially comprise discrete particles and/or spherical particles. In certain embodiments, the branched polysilicate structures can be characterized as having a mass fractal dimension typically 1.4 and 2.9, more preferably between 1.44 and 2.5, and most preferably between 1.5 and 2.4. Without being bound by any specific theory, spherical silica particles typically have mass fractal dimensions that approach a value of 3, which renders them non-fractal.

In various embodiments the alkoxy silane precursor comprises organically modified silane monomers having a general formula of, for example, $(R')_xSi(OR)_{4-x}$, wherein x can be 0, 1 or 2, and R and R' can be the same or different and can include an organic group, such as, for example, an alkyl, an alkenyl, an alkynyl, an aryl group, or combinations thereof. The alkoxy silane precursor may comprise one or more silane compounds including, but not limited to, methyltrimethoxy silane, vinyltrimethoxy silane, dimethyldiethoxy silane, methacryloxypropyltrimethoxy silane, mercaptopropyltrimethoxy silane, chloropropyltrimethoxy silane, bromopropyltrimethoxy silane, iodopropyltrimethoxy silane, and chloromethyltrimethoxy silane, tetraethoxysilane, tetramethoxysilane, and 1,2-bis (triethoxysilyl) ethane.

In some embodiments, the hydrolysis reaction step can be carried out in any suitable solvent in combination with water. Example solvents are methanol, ethanol, or any polar solvent at least partially miscible with water. In most embodiments, the water to silicon molar ratio is less than approximately 10, preferably between approximately 1.0 and approximately 3.0, but more preferably between approximately 1.0 and approximately 1.5. A low water to silicon ratio, i.e. less than approximately 4.0, is preferable to form the desired three-dimensional branched polysilicate structure during the base-catalyzed gelation step. In other embodiments, the acid used to catalyze the hydrolysis step can be any suitable acid such as, for example, 1.0 N hydrochloric acid or any other source of hydrogen ions. The reaction products of hydrolysis step include species having the general formula of $(R')_xSi(OR)_{4-x}$, wherein x can be 0, 1 or 2, and R' can be the same or different and can include the aforementioned organic groups, but more preferably a hydrogen atom, indicating a hydrolyzed or partially hydrolyzed product.

In various embodiments, the aforementioned acid catalyzed hydrolysis product is preferably treated with a base catalyst to drive the gelation reaction, wherein specific polysilicate structures are formed and present as a polysilicate gel. In some embodiments, additional dilution of the hydrolyzed product is desired to ensure bulk processing capability of the polysilicate gel. The base catalyzed polysilicate gel formation is preferably carried out in a temperature range of about 20° C. to 70° C., more preferably in a temperature range of 40° C. to 65° C., and most preferably in a temperature range of 50° C. to 60° C. In certain embodiments, the reaction time can range between a few hours to 14 days, but in some embodiments, it is preferable to complete the gelation reaction within 18 to 36 hours, and more preferable to run the reaction at 24 hours. The gel is preferably loosely suspended when the reaction is complete, thereby enabling ease of processing in subsequent steps in the manufacturing process.

In various embodiments, the base-catalyzed polysilicate gel comprises branched polysilicate structures that are loosely connected and have a high degree of hydroxyl functionality. The solvents used in the acid catalyzed hydrolysis and base catalyzed gelation steps are typically present in the polysilicate gel structure and also present as excess solvent in which the gel is suspended.

In some embodiments, the resulting suspended polysilicate gel can be dispersed in its reacted form or in additional solvent by means of high power sonication. The resulting dispersion is a colloidal suspension of the polysilicate structures formed in the base-catalyzed gelation reaction step, and the polysilicate structures preferably have a high degree of hydroxyl functionality.

Embodiments of the present method of preparing a superhydrophobic coating solution further include a chemical reaction on the surfaces of the hydroxyl-functionalized polysilicate structures. In certain embodiments, the reaction involves one or more functionalized silylating agents and the surface hydroxyl groups pendant on the dispersed polysilicate structures. The silylating agent or agents are preferably added directly to the aforementioned dispersion of hydroxyl-functionalized polysilicate structures. The temperature at which the reaction occurs is preferably in the range of approximately 20° C. to 70° C., preferably between approximately 40° C. and 65° C., and most preferably between about 50° C. and 60° C. In certain embodiments, full extent of the reaction takes place over a period of approximately 4 to 72 hours. Upon sufficient completion of the reaction, the dispersed polysilicate structures will have the functionality characteristic of the silylating agent. The silylating agent also preferably prevents the dispersed polysilicate structures from reforming into a gel.

In various embodiments, any suitable silane can be used as the silylating agent, such as, for example, trimethylchlorosilane, trichloromethylsilane, trichlorooctylsilane, hexamethyldisilazane, or any reactive silane including at least one hydrophobic ligand. While not intending to be bound by any specific theory, it is believed that the silylation reaction step being performed using the dispersed polysilicate structures ensures the maximum replacement of surface hydroxyl moieties of the polysilicate structures, which thereby imparts the maximum extent of hydrophobicity to the final material when deposited as a coating. In certain embodiments, the silylating agent can be chosen to have an oleophobic (oil repellency) functionality, such as with Trichloro (1H,1H,2H,2H-perfluorooctyl) silane, Trichloro(3,3,3-trifluoropropyl)silane, 1H,1H,2H,2H-Perfluorooctyl-triethoxysilane, or any silylating agent that contains at least one fluorine atom.

In one embodiment of the present invention, the prepared coating solution is capable of depositing a superhydrophobic layer or surface onto an article after the aforementioned chemical reaction with the hydroxyl-functionalized polysilicate structures and the silylating agent. In various embodiments, further dilution with an alcohol may be desired to tailor the superhydrophobic coating solution to a given coating deposition method. In certain embodiments, additional solvents may be added to impart a slower evaporation rate to the coating solution. These may include propylene glycol monomethyl ether, tetrahydrofuran, dioxane, or diethoxyethane, which optionally may be added in combination to obtain specific solvent evaporation characteristics.

In embodiments of the present invention, deposition of the superhydrophobic coating solution to provide a superhydrophobic coated surface can be achieved using a variety of coating methods known to those skilled in the art. These can include dip-coating, spin-coating, spray-coating, flow-coating aerosol deposition via a propellant, or ultrasonic aerosolizing of the superhydrophobic coating solution. The drying time of the coating solution is solvent choice dependent, but in most embodiments drying occurs within 10 minutes of deposition of the solution. The coating solution can be dried under ambient conditions or in the presence of heat and airflow to aid the drying process per the specific application.

The exemplary superhydrophobic surface can include a superhydrophobic coating having a water contact angle of at least about 150° and a contact angle hysteresis of less than about 5°. The deposited superhydrophobic coating preferably comprises a nanoporous metal oxide imparted with hydrophobic ligands or oleophobic ligands. The pore size is preferably in the range from approximately 5 nm to 1 micron. Any suitable material can be used for as a substrate component for the superhydrophobic coating such as, for example, skin, hair, teeth, plant matter, cloth, fabric, glass, ceramics, polymers, metals or combinations thereof and the like. In various embodiments, each of the one or more superhydrophobic coatings may comprise polysilicate structures which preferably comprise a three dimensional network of silica particles having surface functional groups derivatized with a silylating agent and a plurality of pores. Exemplary silylating agent can include, but are not limited to, trimethylchlorosilane, trichloromethylsilane, trichlorooctylsilane, hexamethyldisilazane, or any reactive silane including at least one hydrophobic ligand. In some embodiments, each of the one or more superhydrophobic coatings can be the same in terms of chemical composition and thickness. In certain embodiments, at least one of the one or more superhydrophobic coatings can be different in terms of chemical composition and thickness. In various embodiments, each of the one or more superhydrophobic coatings can have a thickness from about 0.09 µm to about 3 µm.

In one embodiment of the present invention, the superhydrophobic coating solution and deposited coating have the following properties:

| Properties of the Superhydrophobic Liquid Coating Solution | |
|---|---|
| Solid content % by weight | 0.25-10 |
| Flashpoint (° C.) | between 10-20 |
| Drying Time (seconds) | <180 |
| Viscosity (cP) | 1.2-15 |
| Properties of the Superhydrophobic Coating Material as Dried or Cured | |
| Water Contact Angle (degrees) | >150 |
| Typical Thickness (microns) | <1 (concentration dependent) |
| UV Exposure | Stable |
| % Transmission, % Haze on Glass | 93-96%, 0.4-1.0% |
| Thermal Stability | Up to 400° C. |

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method of producing a hydrophobic or superhydrophobic solution, the method comprising:
    forming a hydrophilic polysilicate gel comprising surface hydroxyl groups;
    dispersing the hydrophilic polysilicate gel, thereby forming a colloidal suspension; and
    reacting a silylating agent with the hydroxyl groups, thereby rendering the dispersed hydrophilic polysilicate gel hydrophobic.
2. The method of claim 1 wherein the dispersing step is performed using sonication.
3. The method of claim 1 wherein the colloidal suspension is metastable.

4. The method of claim 1 the suspension comprises a solvent.

5. The method of claim 1 wherein the reacting step comprises replacing the hydroxyl groups with hydrophobic ligands present in the silylating agent.

6. The method of claim 1 wherein the solution is optically clear after the reacting step.

7. The method of claim 1 wherein the number of surface hydroxyl groups is sufficient to render the dispersed hydrophilic polysilicate gel hydrophobic after the reacting step.

8. The method of claim 1 wherein the forming step comprises:
   fully or partially hydrolyzing at least one alkoxy silane precursor via water and an acid catalyst in a solvent to form a hydrolysis product; and
   catalyzing the hydrolysis product with a base to form a gel.

9. The method of claim 8 wherein the hydrolyzing step is performed with a water to silicon molar ratio of less than 4.

10. The method of claim 8 wherein the catalyzing step and/or the reacting step is performed between 40° C. to 65° C.

11. The method of claim 1 wherein the silylating agent is oleophobic.

12. The method of claim 1 further comprising adding a solvent to the solution after the reacting step to form a coating.

* * * * *